(12) United States Patent
Flowers et al.

(10) Patent No.: US 12,259,260 B1
(45) Date of Patent: Mar. 25, 2025

(54) RAIN-RESISTANT, DRAINLESS, HEATED AIR DATA PROBE ASSEMBLIES AND ASSOCIATED METHODS OF MANUFACTURING

(71) Applicant: Amazon Technologies, Inc., Seattle, WA (US)

(72) Inventors: Jonathan Barak Flowers, Seattle, WA (US); Andrew Ferguson, Seattle, WA (US); Asintha Nanayakkara, Seattle, WA (US); David M. Birch, Guildford (GB); Paul Nathan, Guildford (GB)

(73) Assignee: Amazon Technologies, Inc., Seattle, WA (US)

( * ) Notice: Subject to any disclaimer, the term of this patent is extended or adjusted under 35 U.S.C. 154(b) by 140 days.

(21) Appl. No.: 18/064,780

(22) Filed: Dec. 12, 2022

(51) Int. Cl.
| | | |
|---|---|---|
| *G01D 3/08* | (2006.01) | |
| *G01D 11/24* | (2006.01) | |
| *G01F 1/46* | (2006.01) | |
| *G01P 1/02* | (2006.01) | |
| *G01P 5/165* | (2006.01) | |

(52) U.S. Cl.
CPC ............. *G01D 3/08* (2013.01); *G01D 11/245* (2013.01); *G01F 1/46* (2013.01); *G01P 1/026* (2013.01); *G01P 5/165* (2013.01)

(58) Field of Classification Search
CPC .......... G01D 3/08; G01D 11/245; G01F 1/46; G01P 5/165; G01P 1/026
See application file for complete search history.

(56) References Cited

U.S. PATENT DOCUMENTS

| | | | | |
|---|---|---|---|---|
| 7,716,980 | B1 * | 5/2010 | Colten | G01P 5/165 |
| | | | | 73/170.02 |
| 2015/0177032 | A1 * | 6/2015 | Schober | G01P 5/14 |
| | | | | 73/861.65 |
| 2019/0178906 | A1 * | 6/2019 | Vadada | G01F 1/46 |
| 2019/0186974 | A1 * | 6/2019 | Golly | G01P 13/025 |
| 2019/0383640 | A1 * | 12/2019 | Naslund | G01C 23/00 |

FOREIGN PATENT DOCUMENTS

| | | | | | |
|---|---|---|---|---|---|
| CA | 3055853 | A1 * | 6/2020 | | B64D 43/00 |
| EP | 3106881 | B1 * | 4/2018 | | G01F 1/46 |

* cited by examiner

*Primary Examiner* — Jamel E Williams
(74) *Attorney, Agent, or Firm* — Athorus, PLLC

(57) ABSTRACT

A rain-resistant, drainless, heated air data probe assembly may comprise a probe having a central channel, one or more peripheral channels, and a heating element. In addition, inner surfaces of the channels may include hydrophilic surfaces, and the outer surface of the probe may include hydrophobic surfaces. The hydrophobic outer surface may reduce water ingress into the channels of the probe, and the hydrophilic inner surfaces may cause dispersion of water that has entered the channels. The heating element may further cause evaporation or running off of water on the outer surface, and may cause evaporation of dispersed water within the channels, which may further eliminate the need for a drain at a terminal end of the probe assembly.

18 Claims, 11 Drawing Sheets

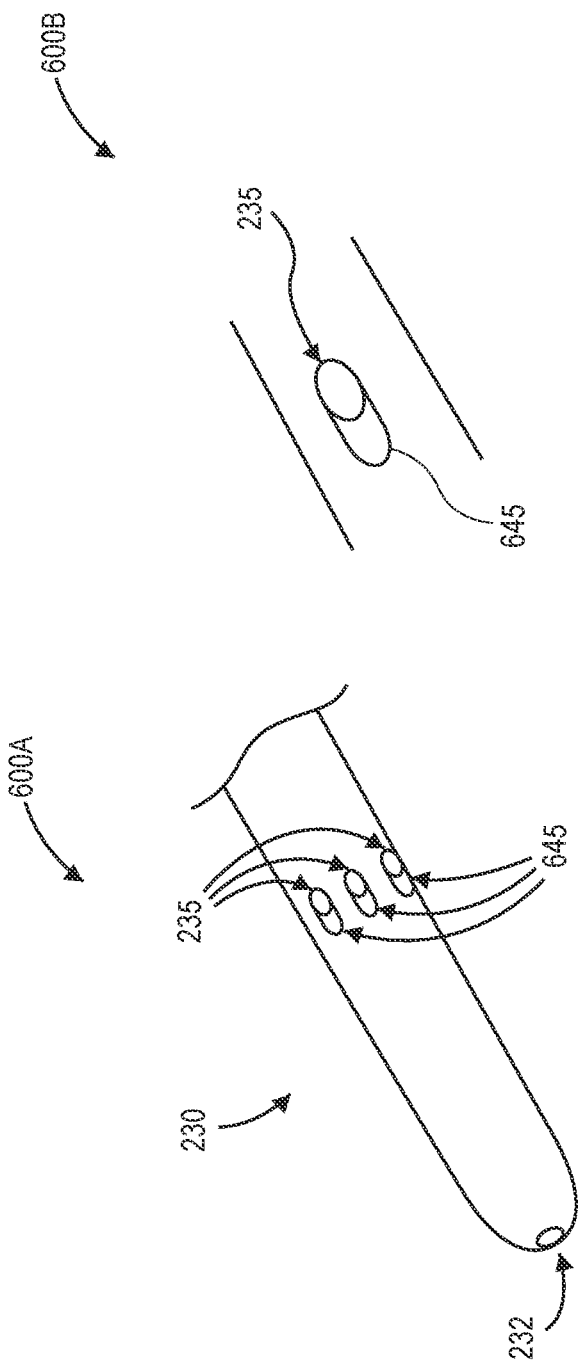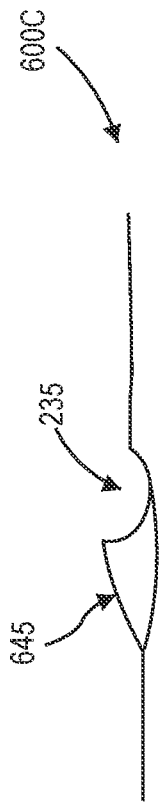

RAIN-RESISTANT, DRAINLESS, HEATED AIR DATA PROBE ASSEMBLIES AND ASSOCIATED METHODS OF MANUFACTURING

BACKGROUND

Conventional air data probes to measure air speed of aerial vehicles may generally be made of metal and include drains for water egress. In addition, such metal probes may be heated to high temperatures in order to melt ice that has formed on the probes, i.e., de-icing. However, the high heating temperatures of the metal probes may make them expensive to manufacture and operate, as well as hazardous or dangerous to personnel. Further, conventional probes with drains attempt to manage water that enters the probes but do not substantially prevent water ingress. Accordingly, there is a need for improved air data probes that reduce or prevent water ingress, and also prevent ice formation, i.e., anti-icing, at lower heating temperatures with lower cost and greater reliability.

BRIEF DESCRIPTION OF THE DRAWINGS

FIGS. 6A-6C are schematic perspective and side view diagrams of portions of an example probe of the air data probe assembly, in accordance with implementations of the present disclosure.

DETAILED DESCRIPTION

Figure 1A:
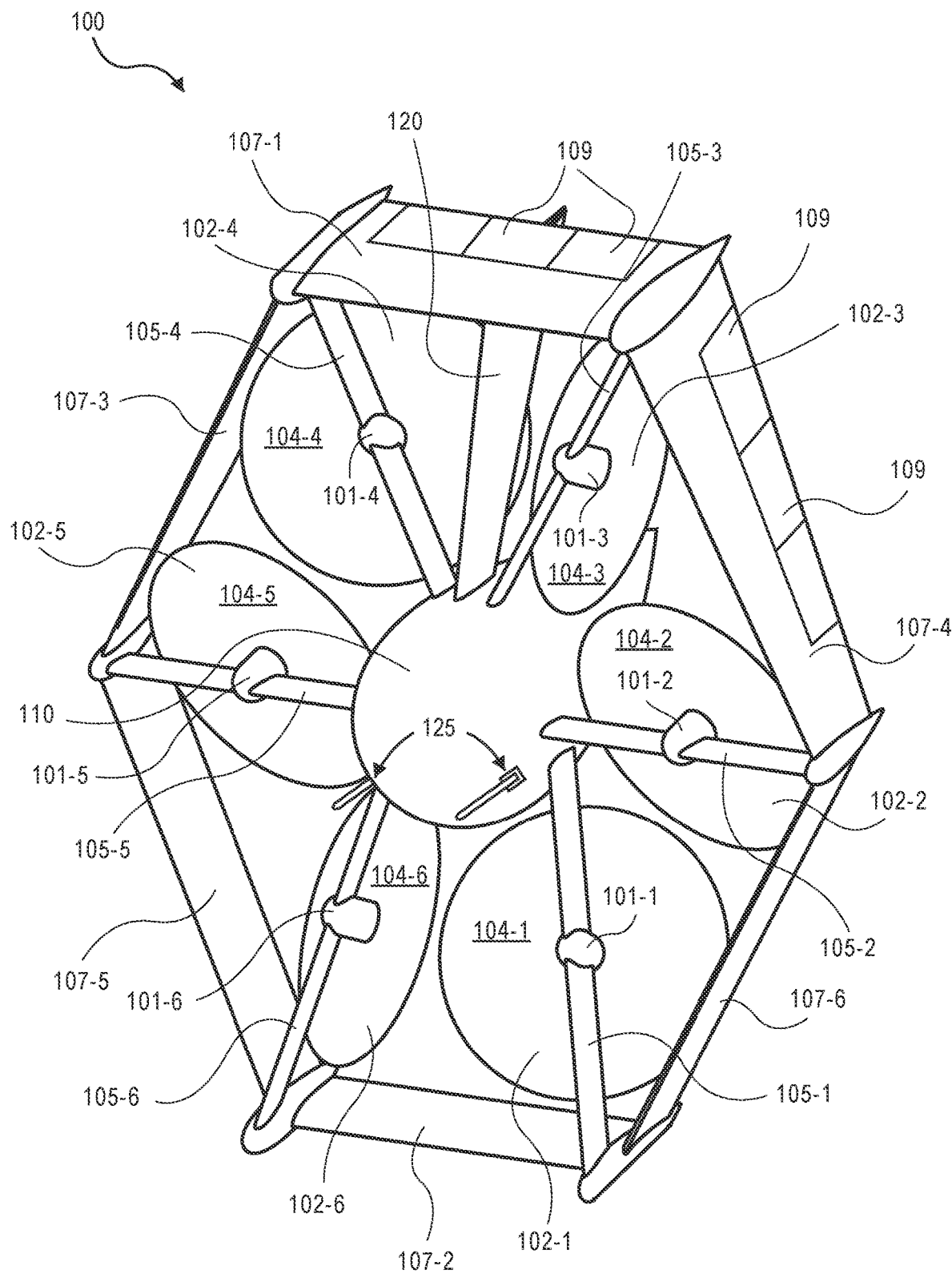
FIGS. 1A-1B are schematic perspective and side view diagrams of an example aerial vehicle having one or more rain-resistant, drainless, heated air data probe assemblies, in accordance with disclosed implementations.

As is set forth in greater detail below, implementations of the present disclosure are directed to rain-resistant, drainless, heated air data probe assemblies and associated methods of manufacturing such air data probe assemblies, which may reduce or prevent water ingress and also prevent ice formation at lower heating temperatures.

In example embodiments, an air data probe assembly may comprise a probe, e.g., a pitot static probe, coupled to a sensor housing. The probe may comprise a central channel to receive and measure the pressure of the incoming air, one or more peripheral channels to measure static air pressure associated with the environment around the probe, and a heating element to apply heat at desired temperatures to portions of the probe. In addition, the sensor housing may comprise one or more air pressure sensors, a sensor package, printed circuit board, processor, memory, and/or various other electronics to receive, process, and/or communicate the data received by the sensors.

In example embodiments, the probe may generally be formed of plastic, e.g., various types of plastics that can withstand the operating temperatures of an aerial vehicle, as well as the desired temperatures at which heat is applied to the probe. In some examples, a lower range of the operating temperature of the probe may be as low as approximately −20 degrees Celsius and/or between approximately −30 and −10 degrees Celsius. In addition, a desired heating temperature for portions of the probe may be approximately 40 degrees Celsius, approximately 50 degrees Celsius, approximately 60 degrees Celsius, and/or between approximately 40 and 60 degrees Celsius.

In additional example embodiments, the heating element of the probe may apply heat substantially evenly to a tip or distal end portion of the probe, including portions of the central channel, peripheral channels, and/or outer surfaces of the probe. Further, the heating element may be selectively activated based on measured temperatures, detected rain, snow, or precipitation, or other weather conditions of an environment around the probe. Alternatively, the heating element may apply heat to the probe substantially continuously, periodically, or intermittently during operation of an aerial vehicle.

In further example embodiments, the central channel and peripheral channels of the probe may include or be formed with hydrophilic surface textures or coatings. The hydrophilic surface textures or coatings may facilitate dispersion or spreading of water or moisture along inner surfaces of the channels, such that the water may be more quickly and efficiently evaporated upon application of heat. In addition, the outer surfaces of the probe may include or be formed with hydrophobic surface textures or coatings. The hydrophobic surface textures or coatings may prevent accumulation of water on the outer surfaces and thereby prevent water ingress into the channels of the probe.

In still further example embodiments, the plastic, heated air data probe assemblies with various hydrophilic and/or hydrophobic surfaces described herein may also be drainless. Generally, a drain of a conventional air data probe assembly may be aligned at a terminal end of the central channel of the probe, which is generally aligned with a forward flight direction of an aerial vehicle, such that the flow of air during flight may generally cause movement of water out of the central channel of the probe via the drain at the terminal end. However, for the example air data probe assemblies described herein, because water ingress may be substantially reduced or prevented via various surface textures or coatings and application of heat, and because any water that enters channels of the probe may also be dispersed, heated, and evaporated via various surface textures or coatings and application of heat, the example air data probe assemblies described herein may function efficiently and reliably in the absence of a drain that permits water egress out of a terminal end of the probe.

Thus, the example air data probe assemblies described herein may substantially reduce or prevent water ingress, and may also prevent ice formation, i.e., anti-icing, at lower heating temperatures with lower cost and greater reliability.

Figure 1B:
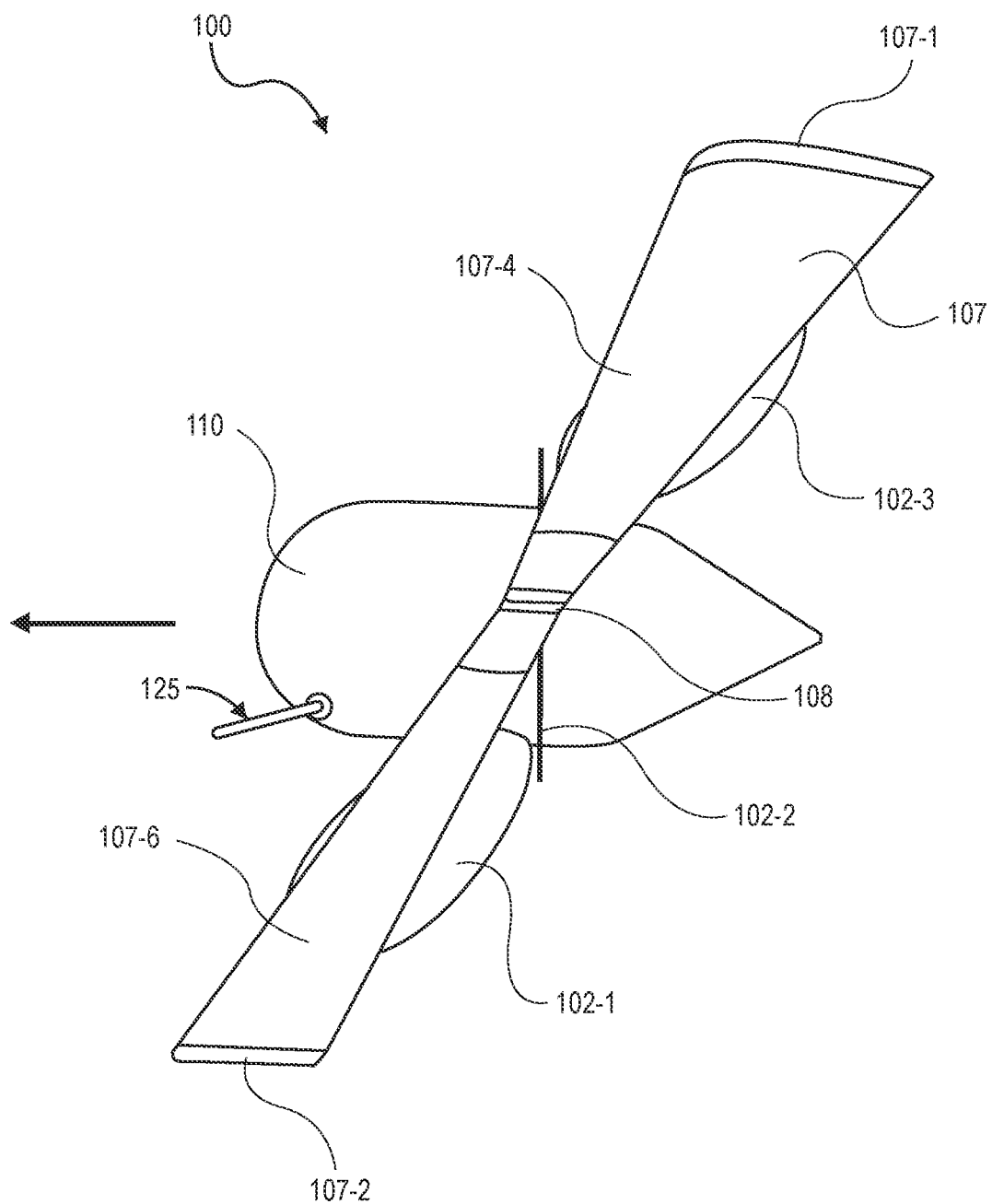

FIGS. 1A-1B are schematic perspective and side view diagrams of an example aerial vehicle 100 having one or more rain-resistant, drainless, heated air data probe assemblies, in accordance with disclosed implementations.

FIG. 1A illustrates a schematic perspective view of an example aerial vehicle 100 with a ring wing that is substantially hexagonal in shape and that surrounds a plurality of propulsion mechanisms, according to disclosed implementations. The aerial vehicle 100 includes six propulsion mechanisms 102-1, 102-2, 102-3, 102-4, 102-5, and 102-6 spaced about the fuselage 110 of the aerial vehicle 100. While the propulsion mechanisms 102 may include motors 101-1, 101-2, 101-3, 101-4, 101-5, and 101-6 and propellers 104-1, 104-2, 104-3, 104-4, 104-5, and 104-6, in other implementations, other forms of propulsion may be utilized as the propulsion mechanisms 102. For example, one or more of the propulsion mechanisms 102 of the aerial vehicle 100 may utilize fans, jets, turbojets, turbo fans, jet engines, and/or the like to maneuver the aerial vehicle. Generally described, a propulsion mechanism 102, as used herein, includes any form of propulsion mechanism that is capable of generating a force sufficient to maneuver the aerial vehicle, alone and/or in combination with other propulsion mechanisms. Furthermore, in selected implementations, propulsion mechanisms (e.g., 102-1, 102-2, 102-3, 102-4, 102-5, and 102-6) may be configured such that their individual orientations may be dynamically modified (e.g., change from vertical to horizontal flight orientation or any position therebetween).

Likewise, while the examples herein describe the propulsion mechanisms being able to generate force in either direction, in some implementations, the propulsion mechanisms may only generate force in a single direction. However, the orientation of the propulsion mechanism may be adjusted so that the force can be oriented in a positive direction, a negative direction, and/or any other direction.

In this implementation, the aerial vehicle 100 also includes a ring wing 107 having a substantially hexagonal shape that extends around and forms the perimeter of the aerial vehicle 100. In the illustrated example, the ring wing has six sections or segments 107-1, 107-2, 107-3, 107-4, 107-5, and 107-6 that are joined at adjacent ends to form the ring wing 107 around the aerial vehicle 100. Each segment of the ring wing 107 has an airfoil shape to produce lift when the aerial vehicle 100 is oriented as illustrated in FIGS. 1A and 1B and moving in a direction that is substantially horizontal. As illustrated, the ring wing 107 is positioned at an angle with respect to the fuselage 110 such that the lower segment 107-2 of the ring wing acts as a front wing as it is toward the front of the aerial vehicle when oriented as shown and moving in a horizontal direction. The upper segment 107-1 of the ring wing 107, which has a longer chord length than the lower segment 107-2 of the ring wing 107, is farther back and thus acts as a rear wing.

The ring wing 107 is secured to the fuselage 110 by motor arms 105. In this example, all six motor arms 105-1, 105-2, 105-3, 105-4, 105-5, and 105-6 are coupled to the fuselage 110 at one end, extend from the fuselage 110 and couple to the ring wing 107 at a second end, thereby securing the ring wing 107 to the fuselage 110. In other implementations, less than all of the motor arms 105 may extend from the fuselage 110 and couple to the ring wing 107. For example, motor arms 105-2 and 105-5 may be coupled to the fuselage 110 at one end and extend outward from the fuselage but not couple to the ring wing 107.

In some implementations, the aerial vehicle 100 may also include one or more stabilizer fins 120 that extend from the fuselage 110 to the ring wing 107. The stabilizer fin 120 may also have an airfoil shape. In the illustrated example, the stabilizer fin 120 extends vertically from the fuselage 110 to the ring wing 107. In other implementations, the stabilizer fin may be at other positions. For example, the stabilizer fin 120 may extend downward from the fuselage 110 between motor arm 105-1 and motor arm 105-6.

In general, one or more stabilizer fins 120 may extend from the fuselage 110, between any two motor arms 105 and couple to an interior of the ring wing 107. For example, stabilizer fin 120 may extend upward between motor arms 105-3 and 105-4, a second stabilizer fin 120 may extend from the fuselage 110 and between motor arms 105-5 and 105-6, and a third stabilizer fin 120 may extend from the fuselage 110 and between motor arms 105-1 and 105-2.

Likewise, while the illustrated example shows the stabilizer fin 120 extending from the fuselage 110 at one end and coupling to the interior of the ring wing 107 at a second end, in other implementations, one or more of the stabilizer fin(s) 120 may extend from the fuselage 110 and not couple to the ring wing 107 or may extend from the ring wing 107 and not couple to the fuselage 110. In some implementations, one or more stabilizer fins 120 may extend from the exterior of the ring wing 107, one or more stabilizer fins 120 may extend from the interior of the ring wing 107, one or more stabilizer fins 120 may extend from the fuselage 110, and/or one or more stabilizer fins 120 may extend from the fuselage 110 and couple to the interior of the ring wing 107.

The fuselage 110, motor arms 105, stabilizer fin 120, and ring wing 107 of the aerial vehicle 100 may be formed of any one or more suitable materials, such as graphite, carbon fiber, aluminum, other metals, plastics, composites, or combinations thereof.

Each of the propulsion mechanisms 102 are coupled to a respective motor arm 105 (or propulsion mechanism arm) such that the propulsion mechanism 102 is substantially contained within the perimeter of the ring wing 107. For example, propulsion mechanism 102-1 is coupled to motor arm 105-1, propulsion mechanism 102-2 is coupled to motor arm 105-2, propulsion mechanism 102-3 is coupled to motor arm 105-3, propulsion mechanism 102-4 is coupled to motor arm 105-4, propulsion mechanism 102-5 is coupled to motor arm 105-5, and propulsion mechanism 102-6 is coupled to motor arm 105-6. In the illustrated example, each propulsion mechanism 102-1, 102-2, 102-3, 102-4, 102-5, and 102-6 is coupled at an approximate mid-point of the respective motor arm 105-1, 105-2, 105-3, 105-4, 105-5, and 105-6 between the fuselage 110 and the ring wing 107. In other embodiments, some propulsion mechanisms 102 may be coupled toward an end of the respective motor arm 105. In other implementations, the propulsion mechanisms may be coupled at other locations along the motor arm. Likewise, in some implementations, some of the propulsion mechanisms may be coupled to a mid-point of the motor arm and some of the propulsion mechanisms may be coupled at other locations along respective motor arms (e.g., closer toward the fuselage 110 or closer toward the ring wing 107).

As illustrated, the propulsion mechanisms 102 may be oriented at different angles with respect to each other. For example, propulsion mechanisms 102-2 and 102-5 are aligned with the fuselage 110 such that the force generated by each of propulsion mechanisms 102-2 and 102-5 is in-line or in the same direction or orientation as the fuselage. In the illustrated example, the aerial vehicle 100 is oriented for horizontal flight such that the fuselage 110 is oriented horizontally in the direction of travel. In such an orientation, the propulsion mechanisms 102-2 and 102-5 provide horizontal forces, also referred to herein as thrusting forces and act as thrusting propulsion mechanisms.

In comparison to propulsion mechanisms 102-2 and 102-5, each of propulsion mechanisms 102-1, 102-3, 102-4, and 102-6 are offset or angled with respect to the orientation of the fuselage 110. When the aerial vehicle 100 is oriented horizontally as shown in FIGS. 1A and 1B for horizontal flight, the propulsion mechanisms 102-1, 102-3, 102-4, and 102-6 may be used as propulsion mechanisms, providing thrust in a non-horizontal direction to cause the aerial vehicle to pitch, yaw, roll, heave and/or sway. In other implementations, during horizontal flight, the propulsion mechanisms 102-1, 102-3, 102-4, and 102-6 may be disabled such that they do not produce any forces and the aerial vehicle 100 may be propelled aerially in a horizontal direction as a result of the lifting force from the aerodynamic shape of the ring wing 107 and the horizontal thrust produced by the thrusting propulsion mechanisms 102-2 and 102-5.

In some implementations, one or more segments of the ring wing 107 may include ailerons, control surfaces, and/or trim tabs 109 that may be adjusted to control the aerial flight of the aerial vehicle 100. For example, one or more ailerons, control surfaces, and/or trim tabs 109 may be included on the upper segment 107-1 of the ring wing 107 and/or one or more ailerons, control surfaces, and/or trim tabs 109 may be included on the side segments 107-4 and/or 107-3. Further, one or more ailerons, control surfaces, and/or trim tabs 109 may also be included on one or more of the remaining segments 107-2, 107-5, and 107-6. The ailerons, control surfaces, and/or trim tabs 109 may be operable to control the pitch, yaw, and/or roll of the aerial vehicle during horizontal flight when the aerial vehicle 100 is oriented as illustrated in FIGS. 1A and 1B.

The angle of orientation of each of the propulsion mechanism 102-1, 102-2, 102-3, 102-4, 102-5, and 102-6 may vary for different implementations. Likewise, in some implementations, the offset of the propulsion mechanisms 102-1, 102-2, 102-3, 102-4, 102-5, and 102-6 may each be the same, with some oriented in one direction and some oriented in another direction, or may each be oriented different amounts, and/or in different directions.

In the illustrated example of FIG. 1A, each propulsion mechanism 102-1, 102-2, 102-3, 102-4, 102-5, and 102-6 may be oriented approximately thirty degrees with respect to the position of each respective motor arm 105-1, 105-2, 105-3, 105-4, 105-5, and 105-6. In addition, the direction of orientation of the propulsion mechanisms is such that pairs of propulsion mechanisms are oriented toward one another. For example, propulsion mechanism 102-1 is oriented approximately thirty degrees toward propulsion mechanism 102-6. Likewise, propulsion mechanism 102-2 is oriented approximately thirty degrees in a second direction about the second motor arm 105-2 and oriented toward propulsion mechanism 102-3. Finally, propulsion mechanism 102-4 is oriented approximately thirty degrees in the first direction about the fourth motor arm 105-4 and toward propulsion 102-5. As illustrated, propulsion mechanisms 102-2 and 102-5, which are on opposing sides of the fuselage 110, are aligned and oriented in a same first direction (in this example, horizontal). Propulsion mechanisms 102-3 and 102-6, which are on opposing sides of the fuselage 110, are aligned and oriented in a same second direction, which is angled compared to the first direction. Propulsion mechanisms 102-1 and 102-4, which are on opposing sides of the fuselage 110, are aligned and oriented in a same third direction, which is angled compared to the first direction and the second direction.

As further illustrated in FIG. 1B, when the aerial vehicle is oriented for horizontal flight, the fuselage 110 is oriented horizontally and two of the propulsion mechanisms, propulsion mechanism 102-2 and the propulsion mechanism 102-5 on the opposing side of the fuselage 110 and illustrated in FIG. 1A, are oriented to produce thrust in a substantially horizontal direction. In comparison, the other propulsion mechanisms, such as propulsion mechanisms 102-1, 102-3, 102-4, 102-6, are not oriented to produce forces in substantially the horizontal direction. During horizontal flight, the propulsion mechanisms, such as propulsion mechanisms 102-1, 102-3, 102-4, 102-6, may be disabled and/or used to produce maneuverability forces that will cause the aerial vehicle to pitch, yaw, and/or roll as it aerially navigates in a substantially horizontal direction. In some implementations, the propulsion mechanisms that are not aligned to produce substantially horizontal forces may be allowed to freely rotate in the wind and energy produced from the rotation may be used to charge the power module of the aerial vehicle 100.

The ring wing 107 is angled such that the lower segment 107-2 of the ring wing is positioned ahead or forward of the upper segment 107-1 of the ring wing 107 during horizontal forward flight. The leading wing, lower segment 107-2 produces a much higher lift per square inch than the rear wing, upper segment 107-1, and the chord length of the lower segment 107-2 is less than the chord length of the upper segment 107-1. Likewise, as illustrated, the upper segment 107-1 of the ring wing has a different camber than the lower segment 107-2. The chord length and camber transition from that illustrated along the upper segment 107-1 to the lower segment 107-2. In implementations that include one or more stabilizer fins, such as stabilizer fin 120 shown in FIG. 1A, the difference between the chord lengths of the lower segment 107-2 and the upper segment 107-1 may be less and/or the difference between the cambers of the lower segment 107-2 and the upper segment 107-1 may be less.

While the side segments, such as side segments 107-3, 107-4, 107-5, 107-6 of the ring wing provide some lift, at the midpoint 108 of each adjacent pair of side segments there is minimal lift produced by the ring wing 107. Because there is minimal lift produced at the midpoint 108, the segments may be tapered to reduce the overall weight of the aerial vehicle. In the example shown in FIG. 1B, the side segments, such as side segments 107-4 and 107-6, are tapered toward the midpoint but retain some dimension for structural integrity and to operate as a protective barrier around the propulsion mechanisms 102. While the illustrated examples show both side segments 107-4 and 107-6 tapering to smaller respective ends at the midpoint 108, in other implementations, the taper may be consistent or continuous from the larger top segment 107-1 to the smaller lower segment 107-2.

In addition to providing lift, the ring wing 107 provides a protective barrier or shroud that surrounds the propulsion mechanisms 102 of the aerial vehicle 100. The protective barrier of the ring wing 107 increases the safety of the aerial vehicle 100. For example, if the aerial vehicle comes into contact with another object, there is a higher probability that the object will contact the ring wing, rather than a propulsion mechanism.

In example embodiments as shown in FIGS. 1A and 1, the example aerial vehicle 100 may also include one or more air data probe assemblies 125, as further described herein. For example, the aerial vehicle may include two air data probe assemblies 125 coupled to opposing lateral sides or surfaces of the fuselage 110. In addition, the one or more air data probe assemblies 125 may be positioned or oriented such that distal ends of the probes are facing or positioned toward a forward flight direction of the aerial vehicle 100. As more clearly shown in FIG. 1B, the air data probe assemblies 125 may not be oriented exactly parallel to a forward flight direction, but may be oriented at an angle relative to the forward flight direction, e.g., approximately 5 degrees, approximately 10 degrees, approximately 15 degrees, or other angles or ranges relative to the forward flight direction.

Although two air data probe assemblies 125 are illustrated in FIGS. 1A and 1B as coupled to portions of the fuselage 110, in other example embodiments, different numbers of air data probe assemblies 125 may be coupled to an aerial vehicle 100, e.g., one, three, or other numbers. In addition, the one or more air data probe assemblies 125 may be coupled to different portions or sections of the aerial vehicle 100, e.g., fuselage 110, motor arms 105, stabilizer fins 120, wing segments, or other portions. Further, the one or more air data probe assemblies 125 may be coupled at different relative positions and/or orientations relative to portions of the aerial vehicle 100 and/or relative to other air data probe assemblies 125 coupled to the aerial vehicle 100.

Furthermore, although the air data probe assemblies are generally described herein in the context of aerial vehicles, in other example embodiments, the air data probe assemblies may be coupled to or associated with other types of vehicles, such as ground-based vehicles, water-based vehicles, and/or other types of airborne or flying vehicles.

Figure 2:
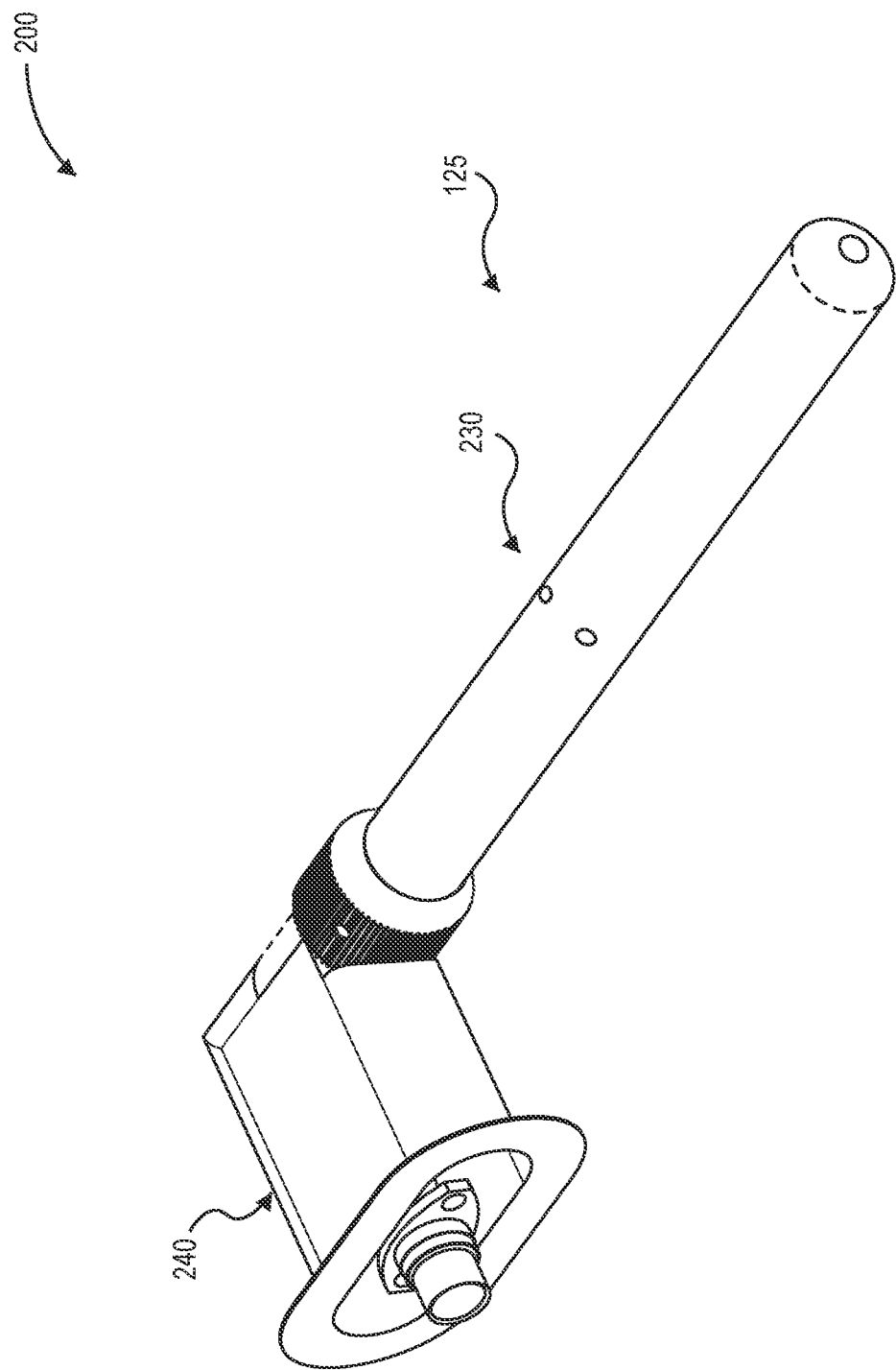
FIG. 2 is a schematic perspective view diagram of an example air data probe assembly including a probe and sensor housing, in accordance with implementations of the present disclosure.

FIG. 2 is a schematic perspective view diagram 200 of an example air data probe assembly including a probe and sensor housing, in accordance with implementations of the present disclosure.

As shown in FIG. 2, an air data probe assembly 125 may include a probe 230 and a sensor housing 240. For example, the probe 230 may comprise a pitot static probe that may be configured to detect or measure an air speed of an aerial vehicle 100 to which the air data probe assembly 125 may be coupled. As further described herein, the probe 230 may comprise a central channel having an associated opening at a distal end to detect or measure air pressure substantially along a forward flight direction. In addition, the probe 230 may also comprise one or more peripheral channels having associated openings on lateral sides or around a circumference of the body of the probe to detect or measure static air pressure of the environment. Further details of the probe 230 of the air data probe assembly 125 are described herein at least with respect to FIGS. 3A, 4, 5, and 6A-6C.

In addition, the sensor housing 240 may comprise an enclosure, casing, or housing for one or more sensors and various other electronics to detect, measure, or determine an air speed of an aerial vehicle. The sensors may be pressure sensors, diaphragms, or other types of sensors configured to detect or measure air pressures, pressure differentials, and/or dynamic pressures based on the air pressures associated with the central channel and the one or more peripheral channels of the probe. Further details of the sensor housing 240 of the air data probe assembly 125 are described herein at least with respect to FIGS. 3B and 4.

Figure 3A:
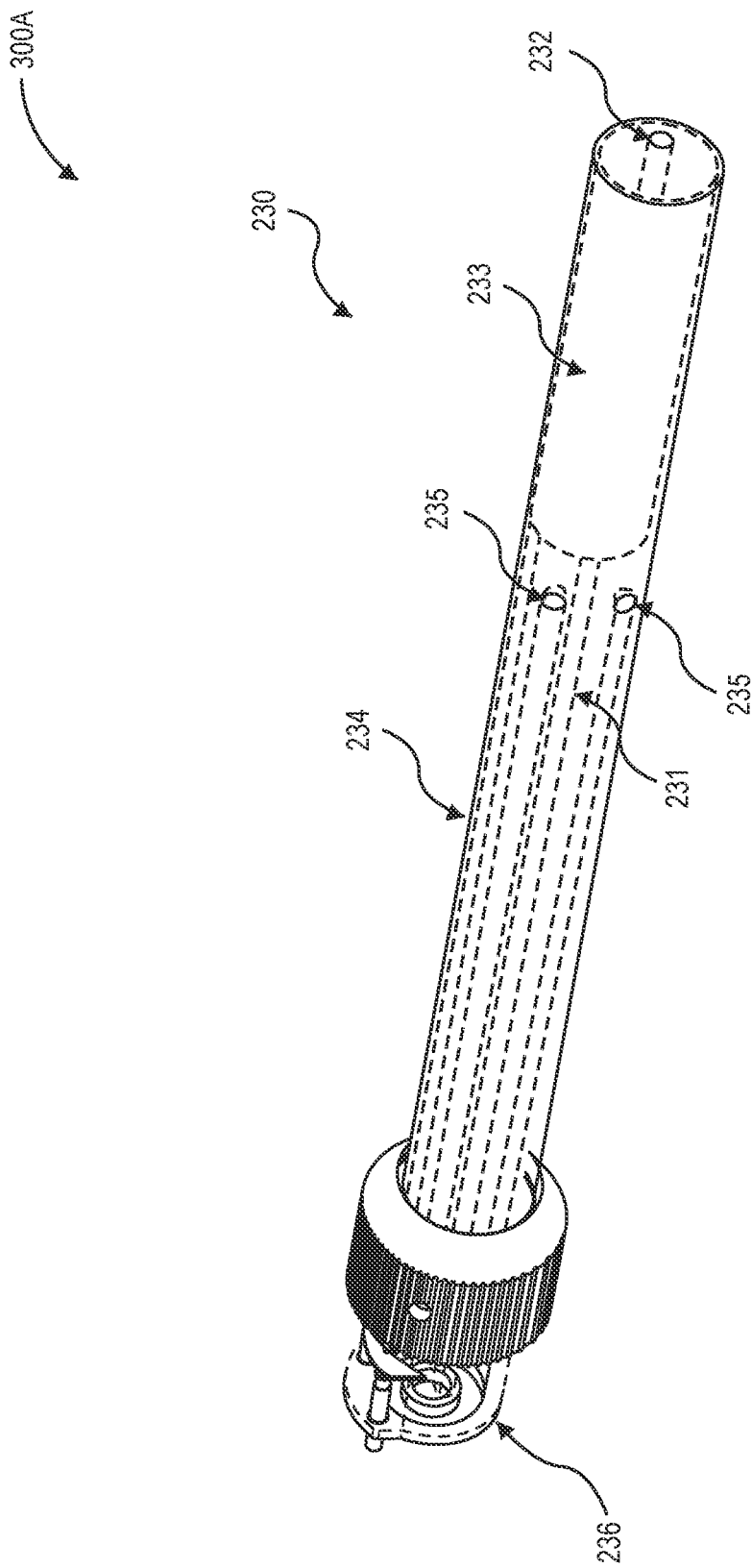
FIG. 3A is a schematic perspective view diagram of an example probe of the air data probe assembly, in accordance with implementations of the present disclosure.

FIG. 3A is a schematic perspective view diagram 300A of an example probe of the air data probe assembly, in accordance with implementations of the present disclosure.

As shown in FIG. 3A, an example probe 230 may comprise an inner cylindrical body 231 having a central channel 232 and associated opening, a heating element 233, an outer cylindrical body 234 having at least one peripheral channel 235 and associated openings, and a gasket 236.

In example embodiments, the inner cylindrical body 231 may be formed or molded in a substantially cylindrical shape that extends between a distal end that is oriented toward a forward flight direction and a terminal end proximate the gasket 236 and connection to a sensor housing 240, as shown in FIG. 2. The inner cylindrical body 231 may be formed of plastics or other similar materials. In some examples, the inner cylindrical body 231 may have a length between the distal end and the terminal end of approximately 100 mm, approximately 200 mm, approximately 500 mm, or other lengths.

In addition, a central channel 232 having an associated opening proximate a distal end of the inner cylindrical body 231 may extend along a length of and substantially along a centerline of the inner cylindrical body 231. At a terminal end of the central channel 232 proximate the gasket 236 and connection to a sensor housing 240, the central channel 232 may be in fluid communication with one or more sensors of the sensor housing 240 to detect or measure air pressures, pressure differentials, and/or dynamic pressures.

The heating element 233 may be coupled to, applied to, or formed around an outer surface of the inner cylindrical body 231. For example, the heating element 233 may comprise a flexible printed circuit board, a wire coil, a cartridge heater, and/or various other types of heating element that is coupled to or formed around the inner cylindrical body 231. As shown in FIG. 3A, the heating element 233 may be positioned generally closer to or proximate the distal end of the inner cylindrical body 231, in order to apply heat to portions of the probe 230 proximate the distal end.

The outer cylindrical body 234 may be coupled to, applied to, or formed or molded around the outer surface of the inner cylindrical body 231 and the heating element 233. In addition, the outer cylindrical body 234 may have a substantially cylindrical shape that extends between a distal end that is oriented toward a forward flight direction and a terminal end proximate the gasket 236 and connection to a sensor housing 240, as shown in FIG. 2. The outer cylindrical body 234 may also be formed of plastics or other similar materials as the inner cylindrical body 231. In some examples, the outer cylindrical body 234 may have a length between the distal end and the terminal end of approximately 100 mm, approximately 200 mm, approximately 500 mm, or other lengths, similar to the inner cylindrical body 231.

Further, at least one peripheral channel 235 having an associated opening around a circumference of the outer cylindrical body 234, e.g., at a lateral side of the probe, may extend into and along a length of the outer cylindrical body 234. At a terminal end of the at least one peripheral channel 235 proximate the gasket 236 and connection to a sensor housing 240, the at least one peripheral channel 235 may be in fluid communication with one or more sensors of the sensor housing 240, e.g., a section that is at ambient or atmospheric pressure, to detect or measure air pressures, pressure differentials, and/or dynamic pressures.

In some examples, a plurality of peripheral channels 235 having associated openings around the circumference of the outer cylindrical body 234, e.g., at lateral sides of the probe, may be formed in the outer cylindrical body 234. The peripheral channels 235 may extend into and along a length of the outer cylindrical body 234 toward the terminal end. In addition, the openings of the peripheral channels 235 may be formed equidistantly or equiradially relative to each other around the circumference of the outer cylindrical body 234. Each of the plurality of peripheral channels 235 may be in fluid communication with one or more sensors of the sensor housing 240 to detect or measure air pressures, pressure differentials, and/or dynamic pressures.

The gasket 236 may be formed at the terminal ends of the inner cylindrical body 231, portions of the heating element 233, and the outer cylindrical body 234. The gasket may include openings corresponding to the central channel 232 and the at least one peripheral channel 235 in order to facilitate fluid communication between the channels and one or more sensors or other portions of the sensor housing 240. In addition, the gasket 236 may substantially seal the terminal ends of the inner cylindrical body 231, portions of the heating element 233, and the outer cylindrical body 234 with the sensor housing 240. The gasket 236 may also be formed of plastics, rubber, silicone, or other similar materials to seal the connection between the probe 230 and the sensor housing 240. Moreover, portions of the heating element 233 may extend through or around the gasket 236 in order to form data and/or power connections between the heating element 233 and various electronics and/or power sources of the sensor housing 240 or an aerial vehicle to which the air data probe assembly is coupled.

Figure 3B:
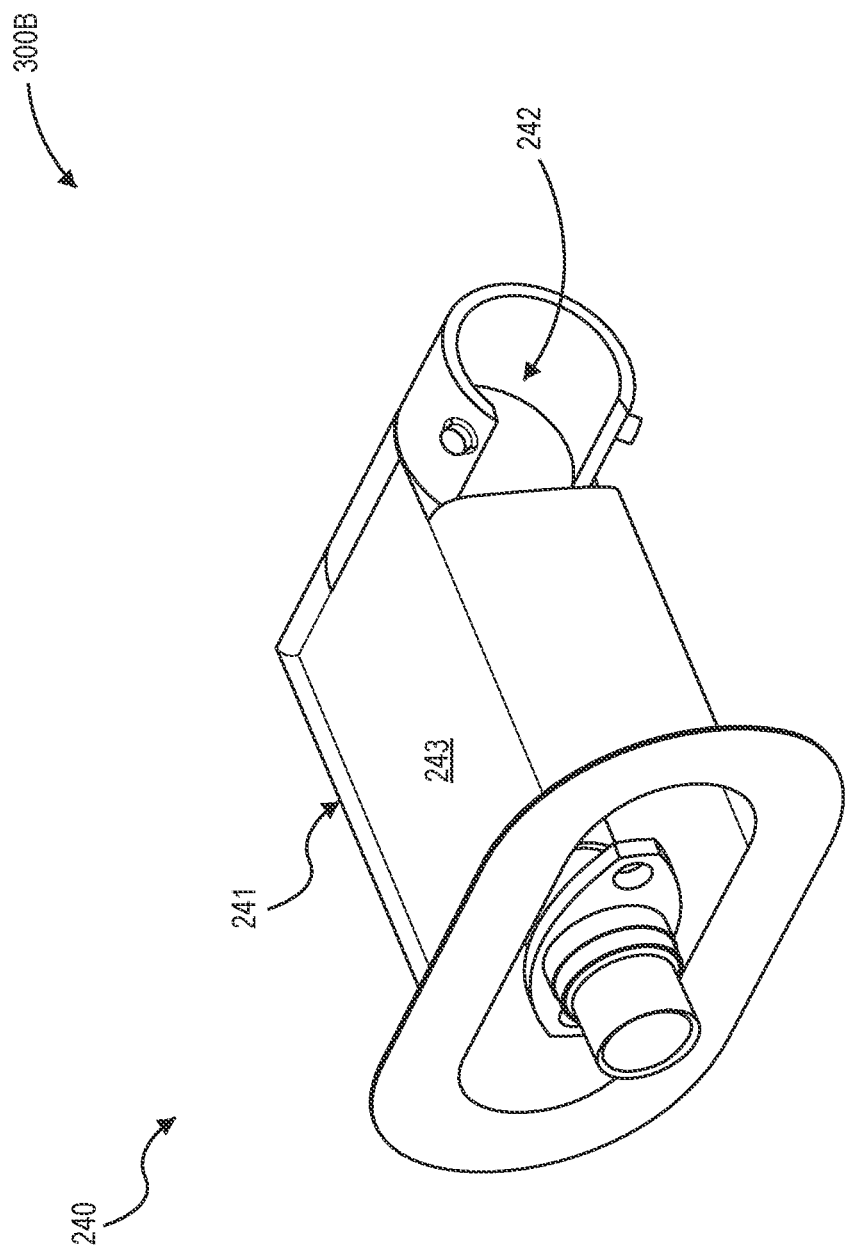
FIG. 3B is a schematic perspective view diagram of an example sensor housing of the air data probe assembly, in accordance with implementations of the present disclosure.

FIG. 3B is a schematic perspective view diagram 300B of an example sensor housing of the air data probe assembly, in accordance with implementations of the present disclosure.

As shown in FIG. 3B, an example sensor housing 240 may comprise an enclosure, casing, or housing 241, one or more sensors 242, and various electronics 243 within the enclosure. For example, the enclosure 241 may provide protection to the sensors 242 and electronics 243 within the enclosure from contact, impact, damage, rain, snow, precipitation, extreme temperatures, and/or other weather conditions associated with an environment around the sensor housing 240. In addition, the enclosure 241 may receive and retain the sensors 242 and electronics 243, as well as various connections with each other and the heating element 233. Further, the enclosure 241 may provide for various electrical, power, and/or data connections to one or more computers, processors, or other control systems, and/or portions of the aerial vehicle to which the air data probe assembly is coupled.

The one or more sensors 242 may comprise various types of pressure sensors, diaphragms, or other types of sensors configured to detect or measure air pressures, pressure differentials, and/or dynamic pressures. For example, one or more pressure sensors may detect or measure an air pressure associated with the central channel 232 of the probe 230, e.g., which may be referred to as an impact or stagnation pressure. In addition, one or more pressure sensors may detect or measure an air pressure associated with the at least one peripheral channel 235 of the probe 230, e.g., which may be referred to as a static pressure. In further examples, one or more pressure sensors may detect or measure a pressure differential, e.g., which may also be referred to as a dynamic pressure, between an impact or stagnation pressure of the central channel 232 and a static pressure of the at least one peripheral channel 235. Based on the detected or measured air pressures, pressure differentials, and/or dynamic pressures, an air speed associated with an aerial vehicle to which the air data probe assembly 125 is coupled may be determined.

The various electronics 243 within the enclosure 241 may comprise, in addition to various sensors or sensor packages described herein, one or more processors, memories, printed circuit boards, communication devices or connections, power electronics, and/or other electronics. For example, the various electronics 243 may receive data that is detected or measured by the pressure sensors, store the data, process the data to determine air pressures, pressure differentials, and/or dynamic pressures, transmit the data to one or more computers, processors, or other control systems via communication devices, and/or transmit the determined air pressures, pressure differentials, and/or dynamic pressures to one or more computers, processors, or other control systems via communication devices. In some examples, the various electronics 243 may not process the data that is detected or measured by the pressure sensors, and instead, the various electronics 243 may transmit the data to one or more computers, processors, or other control systems via communication devices for further processing and determination of air pressures, pressure differentials, and/or dynamic pressures. In additional examples, the power electronics may control activation of the heating element, which may also be based on data detected or measured by one or more environment sensors, as further described herein.

Figure 4:
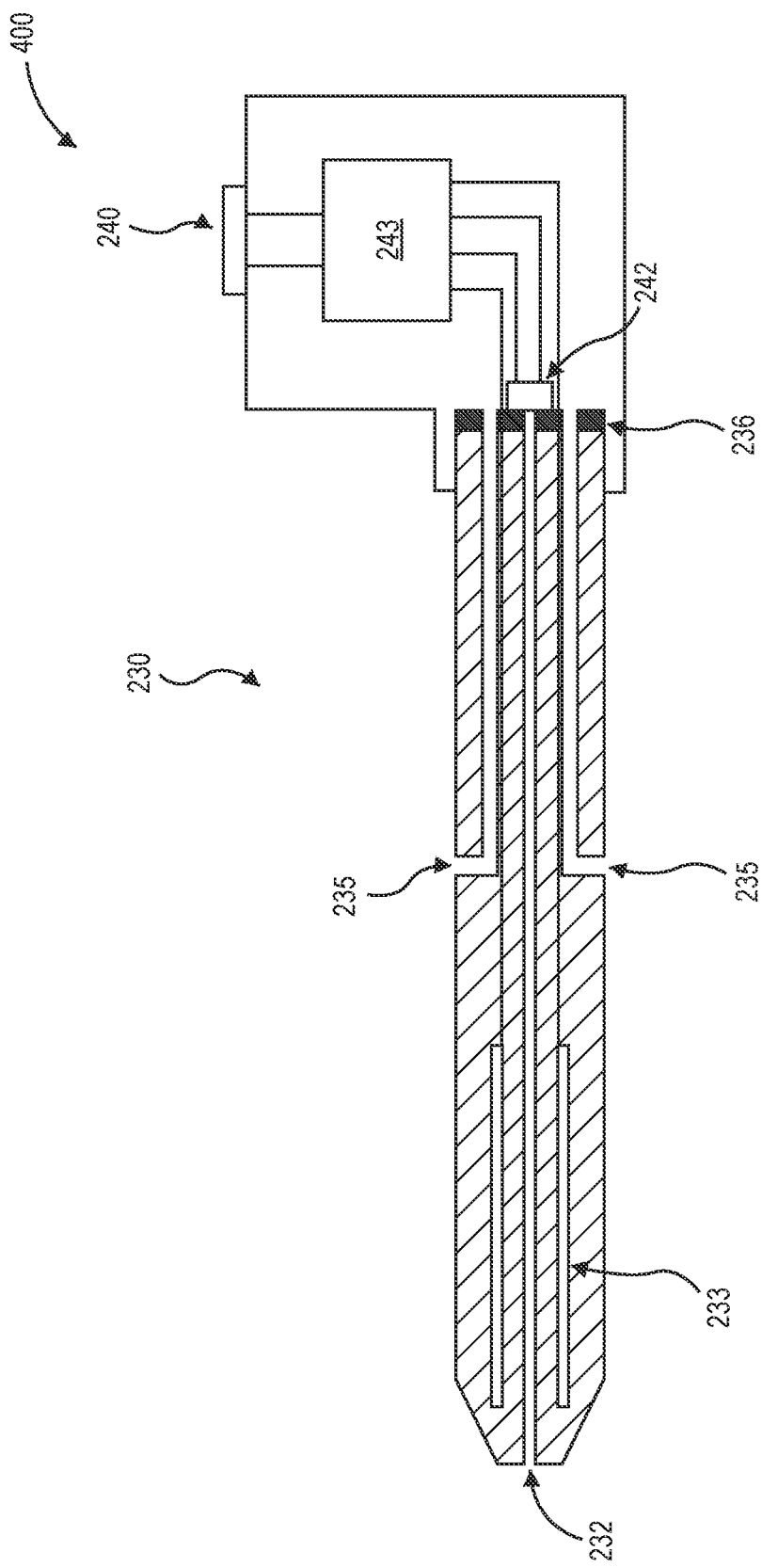
FIG. 4 is a schematic cross-sectional view diagram of an example probe and sensor housing of the air data probe assembly, in accordance with implementations of the present disclosure.

FIG. 4 is a schematic cross-sectional view diagram 400 of an example probe and sensor housing of the air data probe assembly, in accordance with implementations of the present disclosure.

As shown in FIG. 4, the example probe 230 may comprise a central channel 232, a heating element 233, a plurality of peripheral channels 235, and a gasket 236. The example probe 230 shown in FIG. 4 may include any and all of the features of the example probe described herein at least with respect to FIG. 3A. In addition, the example sensor housing 240 may comprise, enclose, or receive one or more pressure sensors 242 and various electronics 243. The example sensor housing 240 shown in FIG. 4 may include any and all of the features of the example sensor housing described herein at least with respect to FIG. 3B.

As more clearly illustrated by the cross-sectional view of FIG. 4, the central channel 232 may extend between the distal end of the probe, e.g., toward a left side of FIG. 4, and the terminal end of the probe proximate the gasket 236 and connection to the sensor housing 240, e.g., toward a right side of FIG. 4. During forward flight of an aerial vehicle to which the air data probe assembly is coupled, e.g., generally in a direction toward a left side of FIG. 4, air flow may enter the central channel 232 and generate an impact or stagnation pressure within the central channel 232 that may be detected or measured by the one or more pressure sensors 242.

In addition, a plurality of peripheral channels 235 may extend along portions of the probe between a midpoint or other point along a length or around a circumference of the probe, e.g., at lateral sides of the probe, and the terminal end of the probe proximate the gasket 236 and connection to the sensor housing 240. During forward flight of an aerial vehicle to which the air data probe assembly is coupled, e.g., generally in a direction toward a left side of FIG. 4, air flow may pass by openings of the peripheral channels 235 and generate a static pressure within the peripheral channels 235 that may also be detected or measured by the one or more pressure sensors 242.

The various electronics 243 may receive the data detected or measured by the one or more pressure sensors 242, and may store, process, and/or transmit the data to one or more computers, processors, or other control systems. In some examples, the various electronics may process the data from the pressure sensors to determine air pressures, pressure differentials, and/or dynamic pressures, in order to determine an air speed of an aerial vehicle to which the air data probe assembly is coupled.

Further, as shown in FIG. 4, the probe 230 may comprise a heating element 233 associated with a portion of the probe 230. For example, the heating element 233 may be positioned at, coupled to, or formed within portions of the probe 230 proximate the distal end. The heating element 233 may be positioned or formed in order to apply heat to portions of the central channel 232 and associated opening proximate the distal end of the probe, portions of the peripheral channels 235 and associated openings along the length or around the circumference of the probe, and/or portions of the outer surfaces of the probe 230 proximate the distal end. By applying heat to such portions of the probe, water, ice, or other moisture may be prevented from accumulating, e.g., anti-icing, on openings and inner surfaces of the central channel and peripheral channels, as well as on outer surfaces of the probe.

In addition, the various electronics 243 may be in data and/or power communication with the heating element 233, e.g., via wired or wireless connections. The various electronics 243 may provide power to the heating element 233 to apply heat. In addition, various electronics 243 may selectively control operation or actuation of the heating element 233 based on additional data related to the environment. For example, one or more temperature sensors, rain, ice, snow, or precipitation sensors, and/or other weather sensors may be associated with an aerial vehicle to which the air data probe assembly is coupled, and based on data from such weather sensors, the heating element 233 may be actuated to apply heat to the probe 230, e.g., to perform an anti-icing function.

In some examples, if data from temperature sensors indicates a temperature below a threshold temperature, e.g., approximately 10 degrees Celsius, approximately 5 degrees Celsius, or other temperatures, the heating element 233 may be actuated to apply heat to the probe 230 to prevent accumulation of moisture, snow, or ice on portions of the probe. In additional examples, if data from precipitation sensors indicates current precipitation within an environment around the aerial vehicle, e.g., rain, snow, ice, or others, the heating element 233 may be actuated to apply heat to the probe 230 to prevent accumulation of moisture, snow, or ice on portions of the probe. In further examples, the heating element 233 may be actuated to apply heat to the probe 230 if both data from temperature sensors indicates a temperature below a threshold temperature, and data from precipitation sensors indicates current precipitation within an environment around the aerial vehicle. In alternative examples, the heating element 233 may be continuously, periodically, or intermittently actuated during operation of an aerial vehicle, without regard to any detected or measured aspects related to current temperature, precipitation, or other weather conditions in the environment around the aerial vehicle.

Moreover, as shown in FIG. 4, the air data probe assembly described herein may not include a drain proximate a terminal end of the probe 230 and/or sensor housing 240. For example, because the heating element 233 applies heat to portions of the probe 230 to evaporate water or moisture, the air data probe assembly may not include a drain proximate the terminal end. In addition, as further described herein at least with respect to FIG. 5, because portions of the probe may include various surface textures or coatings to prevent water ingress and/or facilitate evaporation of water or moisture within channels of the probe, the air data probe assembly may not include a drain proximate the terminal end.

Figure 5:
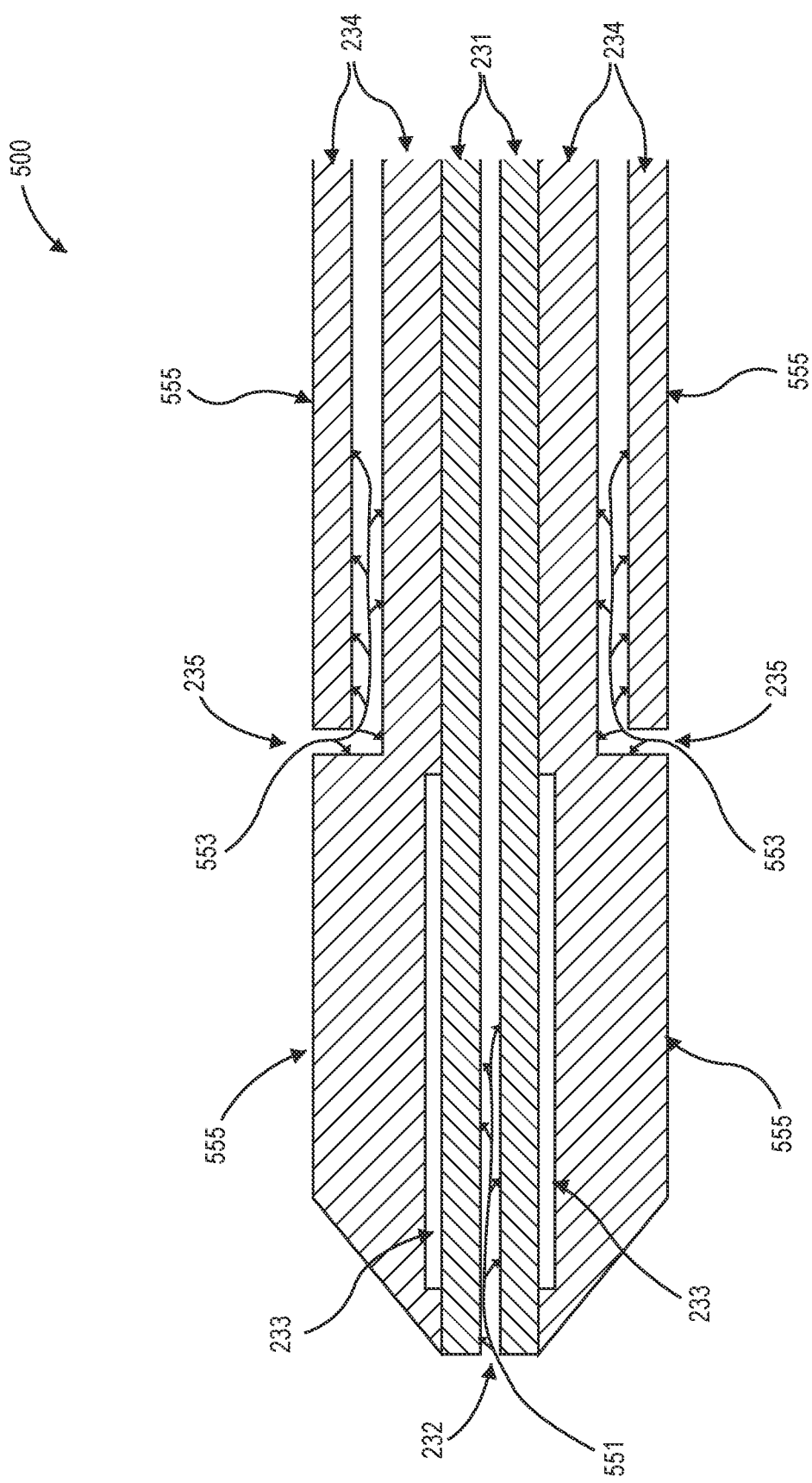
FIG. 5 is a schematic close-up, cross-sectional view diagram of a portion of an example probe of the air data probe assembly, in accordance with implementations of the present disclosure.

FIG. 5 is a schematic close-up, cross-sectional view diagram 500 of a portion of an example probe of the air data probe assembly, in accordance with implementations of the present disclosure.

As shown in FIG. 5, the portion of the example probe 230 may comprise an inner cylindrical body 231, a central channel 232 formed within the inner cylindrical body 231, a heating element 233, an outer cylindrical body 234, and a plurality of peripheral channels 235 formed within the outer cylindrical body 234. The example probe shown in FIG. 5 may include any and all of the features of the example probes described herein at least with respect to FIGS. 3A and 4.

In example embodiments, the example probe may include inner surfaces 551 of the central channel 232 that comprise hydrophilic surface textures and/or hydrophilic coatings, and/or inner surfaces 553 of the peripheral channels 235 that also comprise hydrophilic surface textures and/or hydrophilic coatings. Generally, hydrophilic surface textures and/or coatings may include high surface energy substrates, surface textures, or coatings having water or liquid droplet contact angles of less than 90 degrees. In additional examples, superhydrophilic surface textures and/or coatings may have water or liquid droplet contact angles of less than approximately 30 degrees or approximately 20 degrees.

For example, inner surfaces 551 of the central channel 232 may include hydrophilic surface textures or coatings that are configured to disperse or spread out any water or moisture that contacts the inner surfaces 551. The hydrophilic surface textures may comprise generally rough or varied surface textures, such as a plurality of lines, dots or dimples, bumps or protrusions, crosses or intersections, or other rough or varied textures. In addition, the hydrophilic surface textures may comprise combinations of different rough or varied surface textures, which may create meshing, intersecting, or intertwining patterns or textures. As a result, the hydrophilic surface textures may tend to attract and disperse water or moisture that contacts the inner surfaces 551, thereby increasing a surface area of contact between the inner surfaces 551 and the moisture, so that the moisture can be more quickly evaporated upon application of heat.

In additional examples, hydrophilic coatings may be applied to the inner surfaces 551 of the central channel 232, and the hydrophilic coatings may comprise film coatings, various chemical coatings, and/or other hydrophilic coatings. Similar to the hydrophilic surface textures, the hydrophilic coatings may tend to attract and disperse water or moisture that contacts the inner surfaces 551, thereby increasing a surface area of contact between the inner surfaces 551 and the moisture, so that the moisture can be more quickly evaporated upon application of heat.

Further, inner surfaces 553 of the peripheral channels 235 may also include hydrophilic surface textures or coatings that are configured to disperse or spread out any water or moisture that contacts the inner surfaces 553. For example, hydrophilic surface textures may comprise generally rough or varied surface textures, such as a plurality of lines, dots or dimples, bumps or protrusions, crosses or intersections, or other rough or varied textures. In addition, the hydrophilic surface textures may comprise combinations of different rough or varied surface textures, which may create meshing, intersecting, or intertwining patterns or textures. As a result, the hydrophilic surface textures may tend to attract and disperse water or moisture that contacts the inner surfaces 553, thereby increasing a surface area of contact between the inner surfaces 553 and the moisture, so that the moisture can be more quickly evaporated upon application of heat.

In additional examples, hydrophilic coatings may be applied to the inner surfaces 553 of the peripheral channels 235, and the hydrophilic coatings may comprise film coatings, various chemical coatings, and/or other hydrophilic coatings. Similar to the hydrophilic surface textures, the hydrophilic coatings may tend to attract and disperse water or moisture that contacts the inner surfaces 553, thereby increasing a surface area of contact between the inner surfaces 553 and the moisture, so that the moisture can be more quickly evaporated upon application of heat.

In additional example embodiments, the example probe may include outer surfaces 555 of the probe that comprise hydrophobic surface textures and/or hydrophobic coatings. Generally, hydrophobic surface textures and/or coatings may include low surface energy substrates, surface textures, or coatings having water or liquid droplet contact angles of greater than 90 degrees. In additional examples, superhydrophobic surface textures and/or coatings may have water or liquid droplet contact angles of greater than approximately 150 degrees or approximately 160 degrees.

For example, outer surfaces 555 of the probe may include hydrophobic surface textures or coatings that are configured to repel or cause beading or accumulation of any water or moisture that contacts the outer surfaces 555. The hydrophobic surface textures may comprise generally smooth or continuous surface textures, such as flat, smooth, or polished surface textures. In addition, the hydrophobic surface textures may comprise substantially continuous microtexturing to cause beading or accumulation of water on the outer surfaces 555. As a result, the hydrophobic surface textures may tend to repel and cause beading or accumulation of water or moisture that contacts the outer surfaces 555, thereby causing moisture to accumulate and slide or run off the outer surfaces 555 of the probe, and also reducing or preventing water ingress into the central channel 232 or peripheral channels 235.

In additional examples, hydrophobic coatings may be applied to the outer surfaces 555 of the probe, and the hydrophobic coatings may comprise polyester coatings, various water-insoluble coatings, and/or other hydrophobic coatings. Similar to the hydrophobic surface textures, the hydrophobic coatings may tend to repel and cause beading or accumulation of water or moisture that contacts the outer surfaces 555, thereby causing moisture to accumulate and slide or run off the outer surfaces 555 of the probe, and also reducing or preventing water ingress into the central channel 232 or peripheral channels 235.

By using various combinations of a heating element, hydrophilic surface textures or coatings on inner surfaces of various channels, and/or hydrophobic surface textures or coatings on outer surfaces of the probe, water or moisture accumulation on the outer surfaces of the probe may be reduced or prevented, and/or any accumulated water or moisture on outer surfaces of the probe may be evaporated upon application of heat. Furthermore, water or moisture ingress into the various channels of the probe may also be reduced or prevented, and/or any accumulated water or moisture within inner surfaces of the various channels may be dispersed and evaporated upon application of heat. Moreover, because any water or moisture ingress into the various channels of the probe may be dispersed and evaporated, the air data probe assembly may not include a drain proximate the terminal end.

FIGS. 6A-6C are schematic perspective and side view diagrams 600A, 600B, 600C of portions of an example probe of the air data probe assembly, in accordance with implementations of the present disclosure.

As shown in FIG. 6A, an example probe 230 may include one or more shields or guards 645 proximate openings associated with the plurality of peripheral channels 235. In the close-up, isolated view of FIG. 6B, an opening associated a peripheral channel 235 may include a shield or guard 645 positioned substantially upstream or toward a forward flight direction relative to the opening, e.g., generally in a direction toward a lower left side of FIG. 6B.

Further, as shown in the partial side view of FIG. 6C, the shield or guard 645 may comprise an upstanding or protruding structure or formation positioned substantially upstream or toward a forward flight direction relative to the opening, e.g., generally in a direction toward a left side of FIG. 6C. The shield or guard 645 may further reduce or prevent water ingress into the peripheral channel 235 via the associated opening. In addition, the shield or guard 645 may be a smooth, curved, or angular protrusion or formation that may cause water or moisture on outer surfaces of the probe to slide or run around and/or over the opening associated with the peripheral channel 235.

As a result, one or more shields or guards 645 associated with openings of the plurality of peripheral channels 235 may facilitate sliding or running off of water or moisture from outer surfaces of the probe. In addition, the shields or guards 645 may further reduce or prevent water or moisture ingress into the peripheral channels 235 of the probe.

Figure 7:
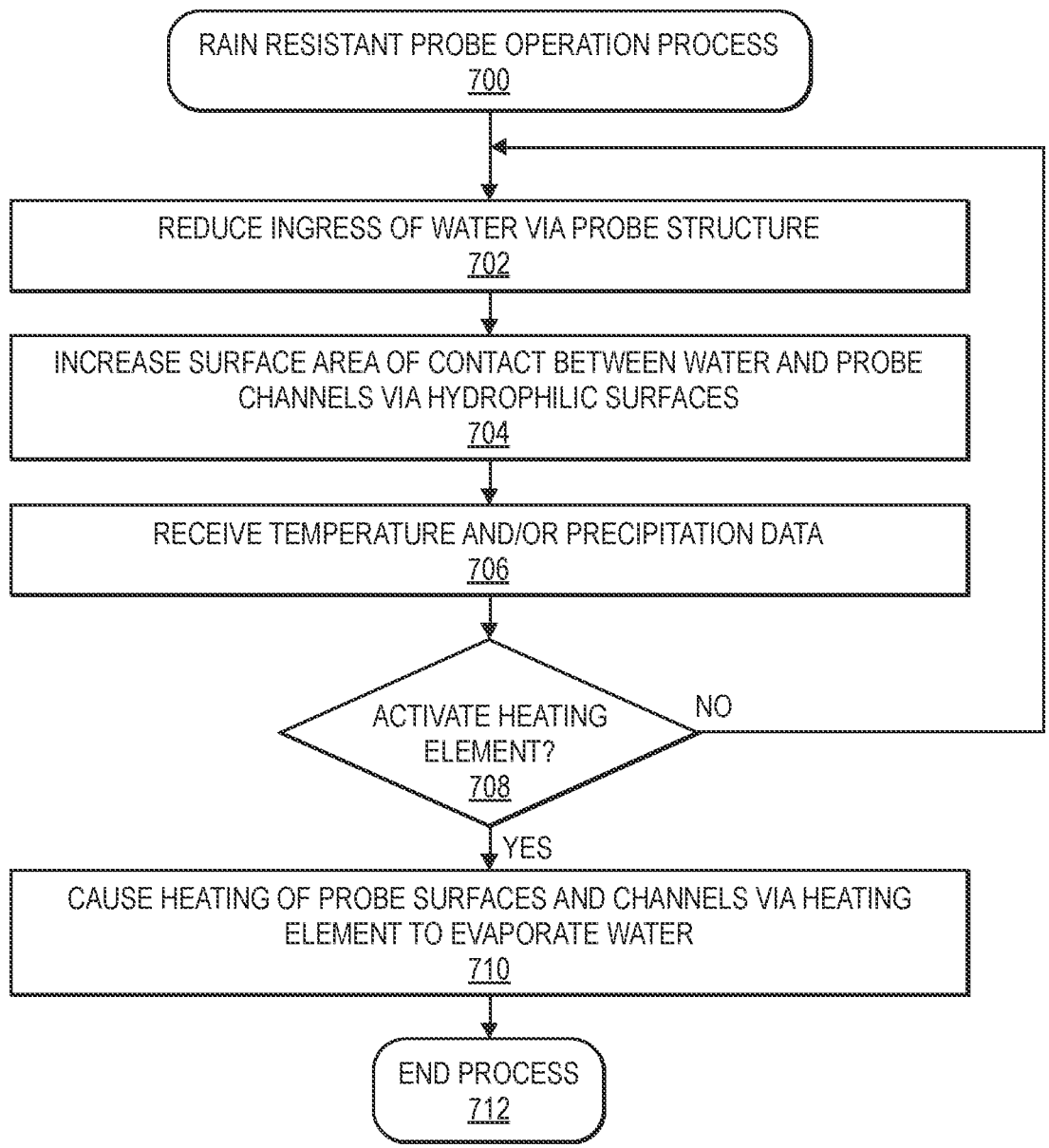
FIG. 7 is a flow diagram illustrating an example rain-resistant probe operation process, in accordance with implementations of the present disclosure.

FIG. 7 is a flow diagram illustrating an example rain-resistant probe operation process 700, in accordance with implementations of the present disclosure.

The process 700 may begin by reducing ingress of water via a probe structure, as at 702. For example, outer surfaces of a probe may include various hydrophobic surface textures or coatings that are configured to cause beading or accumulation of water or moisture on the outer surfaces. In addition, the accumulated water or moisture beads may more readily slide or run off the outer surfaces of the probe, e.g., during forward flight of an aerial vehicle. Further, one or more shields or guards may be associated with or positioned proximate openings of various peripheral channels to reduce or prevent water ingress into the peripheral channels.

The process 700 may continue by increasing surface area of contact between water and probe channels via hydrophilic surfaces, as at 704. For example, the inner surfaces of the central channel and/or peripheral channels of the probe may include hydrophilic surface textures or coatings that are configured to cause dispersion or spreading out of any water or moisture that has entered the channels. By dispersing the water or moisture via hydrophilic surface textures or coatings, the surface area of contact between the moisture and inner surfaces of the channels may be increased.

The process 700 may proceed by receiving temperature and/or precipitation data, as at 706. For example, one or more temperature, precipitation, or other weather sensors associated with an aerial vehicle may receive data associated with current temperature, current precipitation, or other current weather conditions in an environment proximate the aerial vehicle. Further, a control system may receive temperature, precipitation, and/or other weather data.

The process 700 may continue to determine whether to activate the heating element, as at 708. For example, in some example embodiments, the data associated with current weather conditions may be used to determine whether to activate a heating element of the air data probe assembly to perform an anti-icing function and/or evaporate any water or moisture that is in contact with various surfaces of the probe. In some examples, if the current temperature in the environment is below a threshold temperature, e.g., approximately 10 degrees Celsius, approximately 5 degrees Celsius, or other temperatures, then it may be determined to activate the heating element. In other examples, if current precipitation is detected in the environment, then it may be determined to activate the heating element. In further examples, if a combination of both the current temperature below a threshold temperature and also current precipitation are detected in the environment, then it may be determined to activate the heating element. Further, a control system may determine whether to activate the heating element.

If it is not determined to activate the heating element, the process 700 may return to step 702 to continue to reduce water ingress, disperse any moisture within channels, and determine whether to activate the heating element based on detected weather conditions.

If, however, it is determined to activate the heating element, the process 700 may then proceed to cause heating of probe surfaces and channels via the heating element to evaporate water, as at 710. For example, the heating element may be positioned proximate a distal end of the probe and may apply heat to portions of the outer surfaces of the probe, portions of the central channel and associated opening, and/or portions of the peripheral channels and associated openings. By heating the outer surfaces of the probe, any accumulated water or moisture may be evaporated or caused to slide or run off of the outer surfaces of the probe, and also formation of ice or other blockages at openings of the various channels may be reduced or prevented, e.g., anti-icing function. By heating inner surfaces of the central channel and peripheral channels, any water or moisture that has entered the various channels may be caused to evaporate. Further, because any moisture that has entered the channels may be dispersed to increase a surface area of contact with the inner surfaces, the moisture may be more quickly and effectively evaporated from within the various channels. Further, a control system may cause activation of the heating element.

In other example embodiments, data associated with current weather conditions may not be detected or measured, and a heating element of the air data probe assembly may activate substantially independently or agnostically with respect to current weather conditions. In such examples, the heating element may be activated substantially continuously, periodically, or intermittently to perform an anti-icing function and/or evaporate any water or moisture that is in contact with various outer and/or inner surfaces of the probe and various channels.

The process 700 may then end, as at 712.

Figure 8:
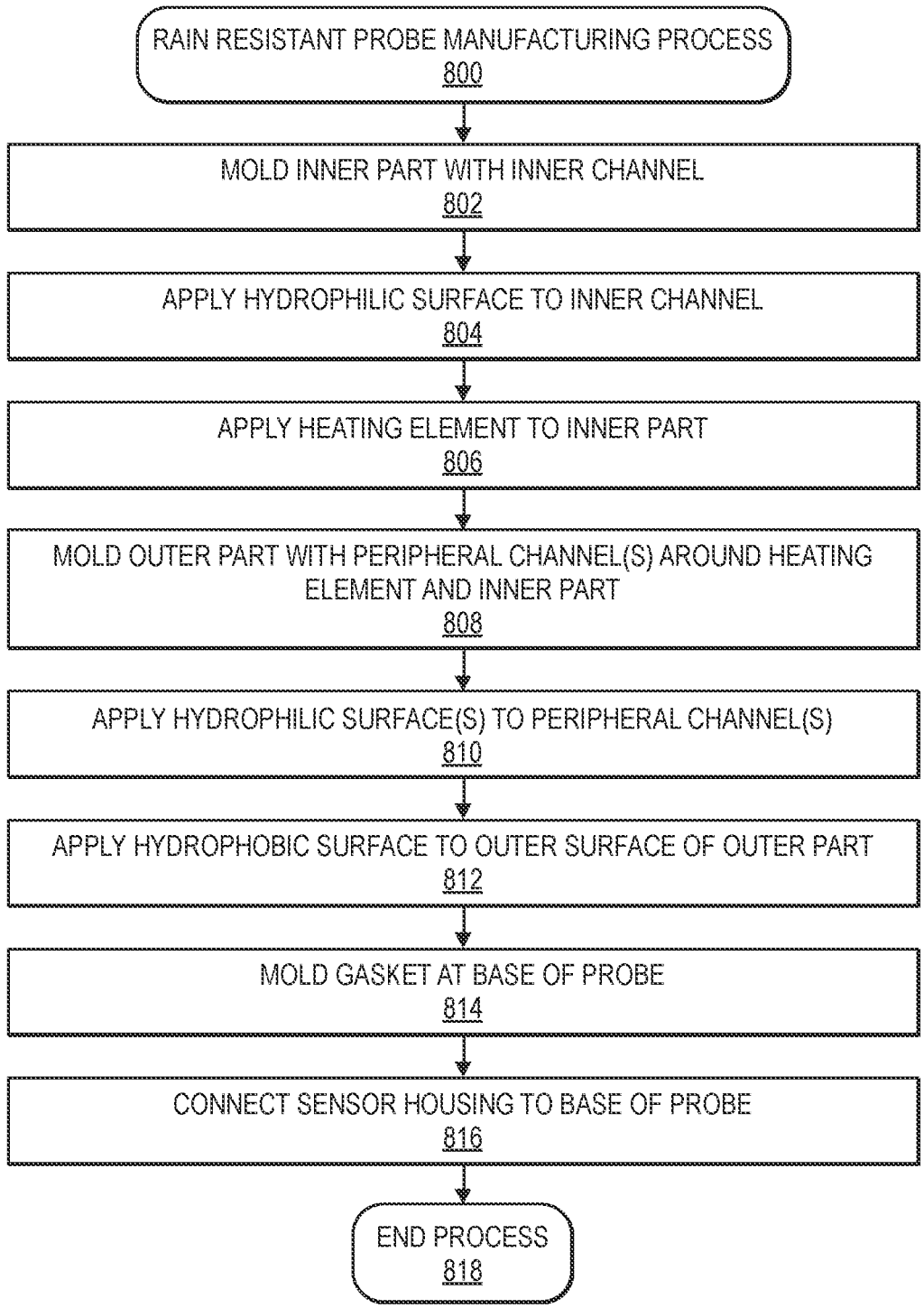
FIG. 8 is a flow diagram illustrating an example rain-resistant probe manufacturing process, in accordance with implementations of the present disclosure.

FIG. 8 is a flow diagram illustrating an example rain-resistant probe manufacturing process 800, in accordance with implementations of the present disclosure.

The process 800 may begin by molding an inner part with an inner channel, as at 802. For example, an inner cylindrical body having a central channel may be molded, e.g., using injection molding or other similar types of molding or forming processes. In alternative example embodiments, the inner cylindrical body may be created by extruding, casting, forming, or other manufacturing processes. The inner cylindrical body may be formed of plastics, similar materials, or combinations thereof. The central channel may extend substantially along a length of and coincident with a centerline of the inner cylindrical body, and include openings at each of the distal and terminal ends. Further, a control system may instruct molding of the inner cylindrical body having a central channel.

The process 800 may continue by applying a hydrophilic surface to the inner channel, as at 804. For example, a hydrophilic surface texture or coating may be applied to inner surfaces of the central channel of the inner cylindrical body. In examples in which the hydrophilic surface texture is mechanically or physically created on the inner surfaces, a pole, bar, rod, beam, or other tool may be inserted into and retracted from the central channel to create the hydrophilic surface texture. In some examples, the pole, rod, or tool may also be used as part of the molding process to form the central channel of the inner cylindrical body, and the hydrophilic surface texture may be formed on the inner surfaces during or upon removal of the tool from within the central channel. In other examples in which the hydrophilic surface comprises a coating, the hydrophilic coating material may be sprayed or injected into the central channel. In alternative examples, the inner cylindrical body may be submerged or placed in a bath or pool of the hydrophilic coating material. However, such examples may require subsequent removal of the hydrophilic coating material from surfaces of the inner cylindrical body other than the inner surfaces of the central channel. Further, a control system may instruct application of a hydrophilic surface to the central channel.

The process 800 may proceed by applying a heating element to the inner part, as at 806. For example, a heating element, such as a flexible printed circuit board, a wire coil, a cartridge heater, or other types of heating elements, may be applied, coupled to, or formed around the inner cylindrical body. In addition, the heating element may be coupled or formed around or proximate a distal end of the inner cylindrical body, such that the distal end of the air data probe assembly may receive relatively more applied heat from the heating element than a terminal end proximate the gasket, sensor, and/or various electronics. The heating element may also be in communication with the various electronics of the sensor housing, e.g., via wired or wireless communication, to receive data and/or power for continuous, periodic, intermittent, or selective application of heat to the air data probe assembly. Further, a control system may instruct application of the heating element to the inner cylindrical body.

The process 800 may continue to mold an outer part with peripheral channel(s) around the heating element and the inner part, as at 808. For example, an outer cylindrical body having one or more peripheral channels may be molded, e.g., using injection molding or other similar types of molding or forming processes, around the heating element and inner cylindrical body. In alternative example embodiments, the outer cylindrical body may be created by casting, forming, or other manufacturing processes. The outer cylindrical body may be formed of plastics, similar materials, or combinations thereof. The peripheral channels may extend substantially along at least a portion of a length of the outer cylindrical body. In addition, the peripheral channels may include respective openings at approximate midpoints or other points along a length of the outer cylindrical body, which may be spaced equidistantly or equiradially around a circumference of the outer cylindrical body e.g., at lateral sides of the probe. Moreover, the respective openings of the peripheral channels may extend to the terminal end of the air data probe assembly. Further, a control system may instruct molding of the outer cylindrical body having one or more peripheral channels around the heating element and inner cylindrical body.

The process 800 may proceed to apply hydrophilic surface(s) to the peripheral channel(s), as at 810. For example, hydrophilic surface textures or coatings may be applied to inner surfaces of the peripheral channels of the outer cylindrical body. In examples in which the hydrophilic surface textures are mechanically or physically created on the inner surfaces, one or more poles, bars, rods, beams, or other tools may be inserted into and retracted from the peripheral channels to create the hydrophilic surface textures. In some examples, the poles, rods, or tools may also be used as part of the molding process to form the peripheral channels of the outer cylindrical body, and the hydrophilic surface textures may be formed on the inner surfaces during or upon removal of the tools from within the peripheral channels. In other examples in which the hydrophilic surfaces comprises coatings, the hydrophilic coating material may be sprayed or injected into the peripheral channels. In alternative examples, the outer cylindrical body may be submerged or placed in a bath or pool of the hydrophilic coating material. However, such examples may require subsequent removal of the hydrophilic coating material from surfaces of the outer cylindrical body other than the inner surfaces of the peripheral channels. Further, a control system may instruct application of hydrophilic surfaces to the peripheral channels.

In further alternative examples, the hydrophilic surfaces of the inner surfaces of the central channel and the inner surfaces of the peripheral channels may be applied substantially simultaneously or concurrently after molding or formation of the outer cylindrical body around the heating element and inner cylindrical body. For example, one or more tools may be used to form hydrophilic surfaces within the inner surfaces of the central channel and the peripheral channels substantially simultaneously or concurrently. In addition, hydrophilic coating materials may be sprayed or injected into the inner surfaces of the central channel and the peripheral channels substantially simultaneously or concurrently. Alternatively, the molded or formed outer cylindrical body, heating element, and inner cylindrical body may be submerged or placed, as a complete unit or subassembly, in a bath or pool of the hydrophilic coating material, which may require subsequent removal of the hydrophilic coating material from other surfaces of the subassembly of the air data probe assembly.

The process 800 may continue with applying a hydrophobic surface to an outer surface of the outer part, as at 812. For example, a hydrophobic surface texture or coating may be applied to the outer surfaces of the outer cylindrical body, e.g., an exterior surface of the probe. In examples in which the hydrophobic surface texture is mechanically or physically created on the outer surfaces, various smoothing, microtexturing, or polishing tools or processes may be used or applied to the outer surfaces to create the hydrophobic surface texture. In some examples, the smoothing, microtexturing, or polishing tools may also be used as part of the molding process to form the outer cylindrical body, and the hydrophobic surface texture may be formed on the outer surfaces during such molding or forming processes. In other examples in which the hydrophobic surface comprises a coating, the hydrophobic coating material may be sprayed or applied onto the outer surfaces. In alternative examples, the outer cylindrical body may be submerged or placed in a bath or pool of the hydrophobic coating material. However, such examples may require additional processing steps to prevent application of hydrophobic coating material to inner surfaces of the channels, and/or subsequent removal of hydrophobic coating material from various portions or sections of the air data probe assembly. Further, a control system may instruct application of a hydrophobic surface to the outer surfaces of the outer cylindrical body.

The process 800 may proceed with molding a gasket at a base of the probe, as at 814. For example, a gasket or seal may be molded, formed, or adhered to a base or terminal end of the probe that is to be connected to the sensor housing. The gasket may be formed of plastics, rubber, silicone, or other similar materials. In addition, the gasket may ensure an appropriate seal at the connections between the various channels of the probe and one or more pressure sensors within the sensor housing, in order to detect or measure air pressures, pressure differentials, and/or dynamic pressures by the sensors and various electronics. Further, a control system may instruct molding of the gasket at the base of the probe.

The process 800 may then continue by connecting a sensor housing to the base of the probe, as at 816. For example, a terminal end of the probe may be inserted into a receiving portion of the sensor housing, and the gasket at the terminal end may substantially seal the connection therebetween. The connection may be made using various types of couplings, fasteners, adhesives, or other connection elements. In some examples, the connection may comprise a threaded connection, a bayonet connection, or other types of connections. Upon connecting the probe with the sensor housing, the various channels of the probe may be in fluid communication with one or more pressure sensors within the sensor housing in order to detect or measure air pressures, pressure differentials, and/or dynamic pressures by the sensors, which data may be further processed to determine an air speed of an aerial vehicle to which the air data probe assembly is coupled. Further, a control system may instruct connection of a sensor housing to a base of a probe to form an air data probe assembly.

The process 800 may then end, as at 818.

Although the example embodiments described herein generally describe an air data probe assembly comprising a pitot static probe or tube having a central channel and one or more peripheral channels, other example embodiments may comprise an air data probe assembly that comprises a pitot probe or tube. In some examples, a pitot probe or tube used in an air data probe assembly as described herein may include a central channel having associated inner surfaces but may not include any peripheral channels. Thus, for such alternative example embodiments, the probe of the air data probe assembly may not include any peripheral channels, corresponding openings, and associated inner surfaces. Moreover, the example probe manufacturing processes for such alternative air data probe assemblies may include molding, forming, or casting an outer part without any peripheral channels, and thus, may not include any formation of hydrophilic surfaces in such non-existent peripheral channels.

Figure 9:
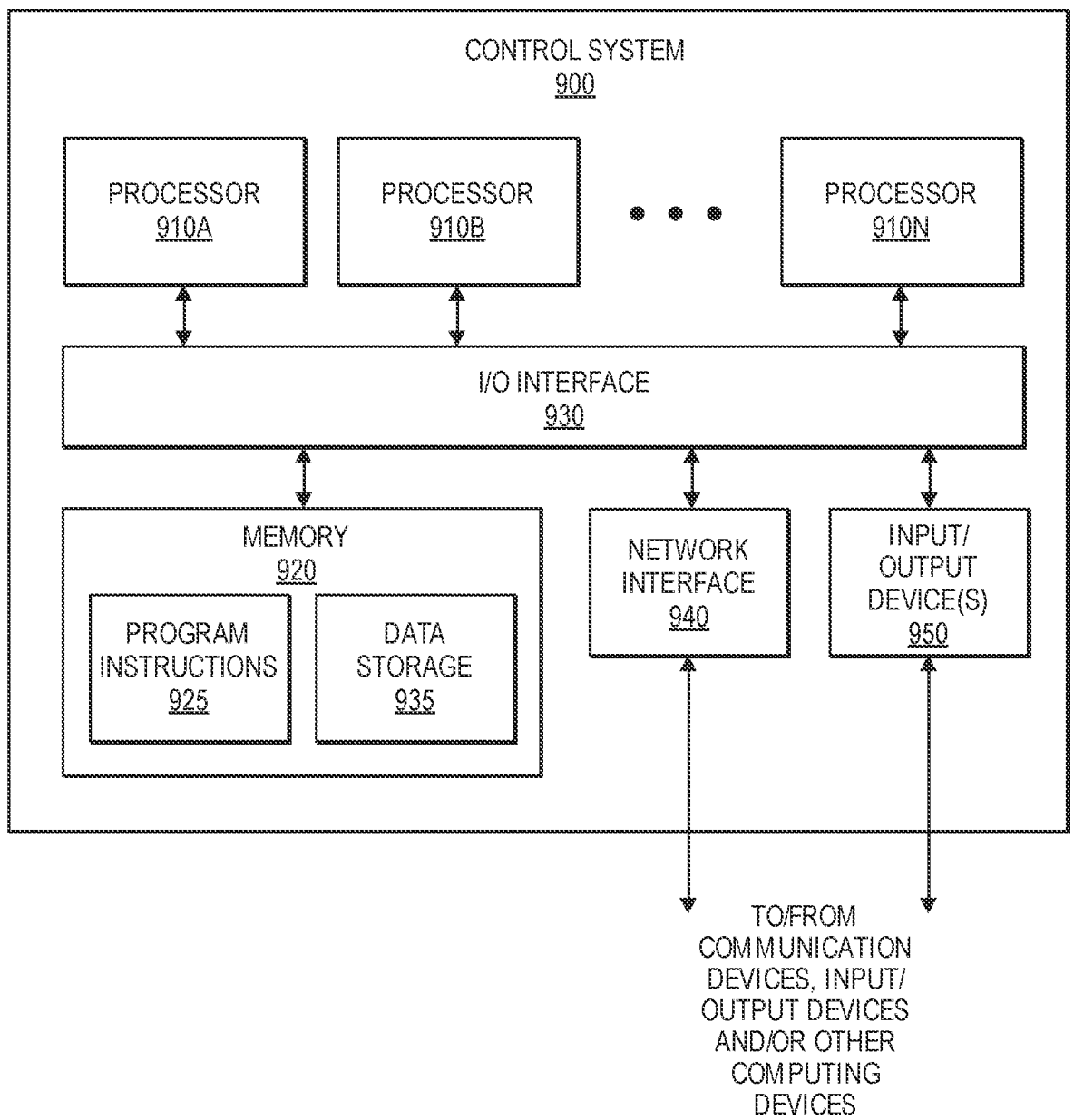
FIG. 9 is a block diagram illustrating various components of an example control system, in accordance with implementations of the present disclosure.

FIG. 9 is a block diagram illustrating various components of an example control system 900, in accordance with implementations of the present disclosure.

Various operations of a control system or controller, such as those described herein, may be executed on one or more computer systems, and/or interacting with various other computers, systems, or devices, according to various implementations. For example, the control system or controller discussed above may function and operate on one or more computer systems. One such control system is illustrated by the block diagram in FIG. 9. In the illustrated implementation, a control system 900 includes one or more processors 910A, 910B through 910N, coupled to a non-transitory computer-readable storage medium 920 via an input/output (I/O) interface 930. The control system 900 further includes a network interface 940 coupled to the I/O interface 930, and one or more input/output devices 950. In some implementations, it is contemplated that a described implementation may be implemented using a single instance of the control system 900 while, in other implementations, multiple such systems or multiple nodes making up the control system 900 may be configured to host different portions or instances of the described implementations. For example, in one implementation, some data sources or services (e.g., related to portions of air data probe assembly operation or manufacturing systems, operations, or processes, etc.) may be implemented via one or more nodes of the control system 900 that are distinct from those nodes implementing other data sources or services (e.g., related to other portions of air data probe assembly operation or manufacturing systems, operations, or processes, etc.).

In various implementations, the control system 900 may be a uniprocessor system including one processor 910A, or a multiprocessor system including several processors 910A-910N (e.g., two, four, eight, or another suitable number). The processors 910A-910N may be any suitable processor capable of executing instructions. For example, in various implementations, the processors 910A-910N may be general-purpose or embedded processors implementing any of a variety of instruction set architectures (ISAs), such as the x86, PowerPC, SPARC, or MIPS ISAs, or any other suitable ISA. In multiprocessor systems, each of the processors 910A-910N may commonly, but not necessarily, implement the same ISA.

The non-transitory computer-readable storage medium 920 may be configured to store executable instructions and/or data accessible by the one or more processors 910A-910N. In various implementations, the non-transitory computer-readable storage medium 920 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions and/or processes, such as those described above, are shown stored within the non-transitory computer-readable storage medium 920 as program instructions 925 and data storage 935, respectively. In other implementations, program instructions and/or data may be received, sent or stored upon different types of computer-accessible media, such as non-transitory media, or on similar media separate from the non-transitory computer-readable storage medium 920 or the control system 900. Generally speaking, a non-transitory, computer-readable storage medium may include storage media or memory media such as magnetic or optical media, e.g., disk or CD/DVD-ROM, coupled to the control system 900 via the I/O interface 930. Program instructions and data stored via a non-transitory computer-readable medium may be transmitted by transmission media or signals such as electrical, electromagnetic, or digital signals, which may be conveyed via a communication medium such as a network and/or a wireless link, such as may be implemented via the network interface 940.

In one implementation, the I/O interface 930 may be configured to coordinate I/O traffic between the processors 910A-910N, the non-transitory computer-readable storage medium 920, and any peripheral devices, including the network interface 940 or other peripheral interfaces, such as input/output devices 950. In some implementations, the I/O interface 930 may perform any necessary protocol, timing or other data transformations to convert data signals from one component (e.g., non-transitory computer-readable storage medium 920) into a format suitable for use by another component (e.g., processors 910A-910N). In some implementations, the I/O interface 930 may include support for devices attached through various types of peripheral buses, such as a variant of the Peripheral Component Interconnect (PCI) bus standard or the Universal Serial Bus (USB) standard, for example. In some implementations, the function of the I/O interface 930 may be split into two or more separate components, such as a north bridge and a south bridge, for example. Also, in some implementations, some or all of the functionality of the I/O interface 930, such as an interface to the non-transitory computer-readable storage medium 920, may be incorporated directly into the processors 910A-910N.

The network interface 940 may be configured to allow data to be exchanged between the control system 900 and other devices attached to a network, such as other control systems, aerial vehicle control systems, various types of sensors, manufacturing or assembly system controllers, other computer systems, or between nodes of the control system 900. In various implementations, the network interface 940 may support communication via wired or wireless general data networks, such as any suitable type of Ethernet network.

Input/output devices 950 may, in some implementations, include one or more displays, monitors, projection devices, other visual input/output devices, microphones, speakers, other audio input/output devices, keyboards, keypads, touchpads, scanning devices, imaging devices, temperature, precipitation, weather, or other sensors, photo eyes, proximity sensors, RFID readers, voice or optical recognition devices, or any other devices suitable for entering or retrieving data by one or more control systems 900. Multiple input/output devices 950 may be present in the control system 900 or may be distributed on various nodes of the control system 900. In some implementations, similar input/output devices may be separate from the control system 900 and may interact with one or more nodes of the control system 900 through a wired or wireless connection, such as over the network interface 940.

As shown in FIG. 9, the memory 920 may include program instructions 925 that may be configured to implement one or more of the described implementations and/or provide data storage 935, which may comprise various tables, data stores and/or other data structures accessible by the program instructions 925. The program instructions 925 may include various executable instructions, programs, or applications to facilitate air data probe assembly operations and processes described herein, such as pressure sensor controllers, drivers, or applications, heating element controllers, drivers, or applications, pressure or air speed data processing controllers, drivers, or applications, weather sensor controllers, drivers, or applications, probe manufacturing or assembly system controllers, drivers, or applications, etc. The data storage 935 may include various data stores for maintaining data related to systems, operations, or processes described herein, such as probes, bodies, channels, surfaces, surface textures or coatings, heating elements, pressure sensors, various electronics, air pressures, pressure differentials, air speeds, aerial vehicles, temperature, precipitation, weather, manufacturing or assembly processes, etc.

Those skilled in the art will appreciate that the control system 900 is merely illustrative and is not intended to limit the scope of implementations. In particular, the control system and devices may include any combination of hardware or software that can perform the indicated functions, including other control systems or controllers, computers, network devices, internet appliances, robotic devices, etc. The control system 900 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 7 and 8, orders in which such methods or processes are presented are not intended to be construed as any limitation on the claimed inventions, and any number of the method or process steps or boxes described herein can be omitted, reordered, or combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. An air data probe assembly, comprising:
    a probe comprising a cylindrical body having a central channel and a plurality of peripheral channels, the central channel having an opening at a distal end of the cylindrical body, and the plurality of peripheral channels having respective openings around a circumference of the cylindrical body;
    a heating element coupled to the probe and configured to heat the distal end of the cylindrical body; and
    a sensor housing coupled to a terminal end of the cylindrical body that is opposite the distal end;
    wherein the probe is formed of plastic; and
    wherein inner surfaces of the central channel and the plurality of peripheral channels include hydrophilic surface textures.

2. The air data probe assembly of claim 1, wherein the probe does not include a drain proximate the terminal end of the cylindrical body.

3. The air data probe assembly of claim 1, wherein an outer surface of the probe includes a hydrophobic surface texture.

4. The air data probe assembly of claim 1, wherein the heating element is configured to heat the distal end of the cylindrical body to a temperature between approximately 40 degrees Celsius and approximately 60 degrees Celsius.

5. The air data probe assembly of claim 1, wherein the sensor housing includes an air data sensor positioned at and in fluid communication with a terminal end of the central channel.

6. An air data probe, comprising:
- a cylindrical body;
- a central channel extending between an opening at a distal end and a terminal end of the cylindrical body; and
- at least one peripheral channel extending between a lateral opening along a length of the probe and the terminal end of the cylindrical body;
- wherein an inner surface of the central channel includes at least one of a hydrophilic surface texture or a hydrophilic coating; and
- wherein an inner surface of the at least one peripheral channel includes at least one of the hydrophilic surface texture or the hydrophilic coating.

7. The air data probe of claim 6, wherein the hydrophilic surface texture comprises a texture having a water droplet contact angle of less than 90 degrees and configured to cause dispersion of water on the inner surface.

8. The air data probe of claim 6, wherein the hydrophilic coating comprises a film coating or a chemical coating configured to cause dispersion of water on the inner surface.

9. The air data probe of claim 6, wherein an outer surface of the cylindrical body includes at least one of a hydrophobic surface texture or a hydrophobic coating.

10. The air data probe of claim 9, wherein the hydrophobic surface texture comprises a texture having a water droplet contact angle of greater than 90 degrees and configured to cause beading of water on the outer surface.

11. The air data probe of claim 9, wherein the hydrophobic coating comprises a polyester coating or a water-insoluble coating configured to cause beading of water on the outer surface.

12. The air data probe of claim 6, further comprising:
- a heating element coupled to the cylindrical body and configured to heat the distal end of the cylindrical body.

13. The air data probe of claim 12, wherein the cylindrical body comprises an inner cylindrical body including the central channel, and an outer cylindrical body including at least one peripheral channel; and
- wherein the heating element is coupled between the inner cylindrical body and the outer cylindrical body.

14. The air data probe of claim 12, wherein the heating element comprises at least one of a flexible printed circuit board (PCB), a wire coil, or a cartridge heater.

15. The air data probe of claim 6, wherein the cylindrical body does not include a drain proximate the terminal end of the cylindrical body.

16. A method of manufacturing an air data probe assembly, comprising:
- at least one of molding, forming, casting, or extruding an inner cylindrical body having a central channel that extends between an opening at a distal end and a terminal end of the inner cylindrical body;
- applying a hydrophilic surface texture to an inner surface of the central channel;
- coupling a heating element to an outer surface of the inner cylindrical body;
- at least one of molding, forming, or casting an outer cylindrical body around the inner cylindrical body and the heating element, the outer cylindrical body including at least one peripheral channel that extends between a lateral opening along a length of the outer cylindrical body and a terminal end of the outer cylindrical body; and
- applying a hydrophilic surface texture to an inner surface of the at least one peripheral channel.

17. The method of claim 16, wherein the hydrophilic surface texture of the inner surfaces of the central channel and the at least one peripheral channel comprises a texture having a water droplet contact angle of less than 90 degrees and configured to cause dispersion of water on the inner surfaces.

18. The method of claim 16, further comprising:
- applying a hydrophobic surface texture to an outer surface of the outer cylindrical body that comprises a texture having a water droplet contact angle of greater than 90 degrees and configured to cause beading of water on the outer surface.

\* \* \* \* \*